(12) United States Patent
Enjo et al.

(10) Patent No.: US 7,706,380 B2
(45) Date of Patent: Apr. 27, 2010

(54) DATA TRANSMISSION METHOD, DATA TRANSMISSION APPARATUS AND DATA TRANSMISSION SYSTEM USING THIS METHOD

(75) Inventors: Masayuki Enjo, Tokyo (JP); Masashi Kawanami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1693 days.

(21) Appl. No.: 10/885,016

(22) Filed: Jul. 7, 2004

(65) Prior Publication Data

US 2006/0007962 A1   Jan. 12, 2006

(51) Int. Cl.
*H04L 12/28* (2006.01)

(52) U.S. Cl. .................... 370/395.1; 370/473; 370/535; 370/536

(58) Field of Classification Search ................. 370/535, 370/543, 544, 465, 468, 473, 474, 395, 536
See application file for complete search history.

(56) References Cited

U.S. PATENT DOCUMENTS

| | | | |
|---|---|---|---|
| 3,909,541 A * | 9/1975 | Bobilin | 370/505 |
| 5,712,915 A * | 1/1998 | Onufry, Jr. | 380/270 |
| 6,134,246 A * | 10/2000 | Cai et al. | 370/474 |
| 6,868,093 B1 * | 3/2005 | Bohm et al. | 370/506 |
| 7,139,271 B1 * | 11/2006 | Parruck et al. | 370/392 |
| 2002/0027905 A1 * | 3/2002 | Heuer | 370/386 |
| 2002/0057713 A1 * | 5/2002 | Bagchi et al. | 370/468 |
| 2002/0065073 A1 * | 5/2002 | Natani et al. | 455/422 |
| 2002/0090033 A1 * | 7/2002 | Anderlind et al. | 375/246 |
| 2003/0117945 A1 * | 6/2003 | Zboril | 370/216 |

FOREIGN PATENT DOCUMENTS

| | | |
|---|---|---|
| CN | 1098009 C | 1/2003 |
| JP | 2-272942 | 11/1990 |
| JP | 2000-92146 | 3/2000 |
| JP | 2002-135304 | 5/2002 |
| JP | 2002-191073 | 7/2002 |
| KR | 2002-0029763 | 4/2002 |
| WO | WO 01/15390 A1 | 3/2001 |

* cited by examiner

*Primary Examiner*—Kevin C Harper
*Assistant Examiner*—Sai-Ming Chan
(74) *Attorney, Agent, or Firm*—Oblon, Spivak, McClelland, Maier & Neustadt, L.L.P.

(57) ABSTRACT

A data transmission method includes a step of dividing each data into two or more low-speed data so as to create two or more sequences of low-speed data which are separated by no-signal intervals, a step of adding a fixed pattern for detecting a head or an end of each low-speed data included in each of the two or more sequences of low-speed data to each of the no-signal intervals included in each of the two or more sequences of low-speed data so as to create two or more sequences of fixed-pattern-added low-speed data, and a step of transmitting the two or more sequences of fixed-pattern-added low-speed data to the transmit station connected to the other network.

11 Claims, 5 Drawing Sheets

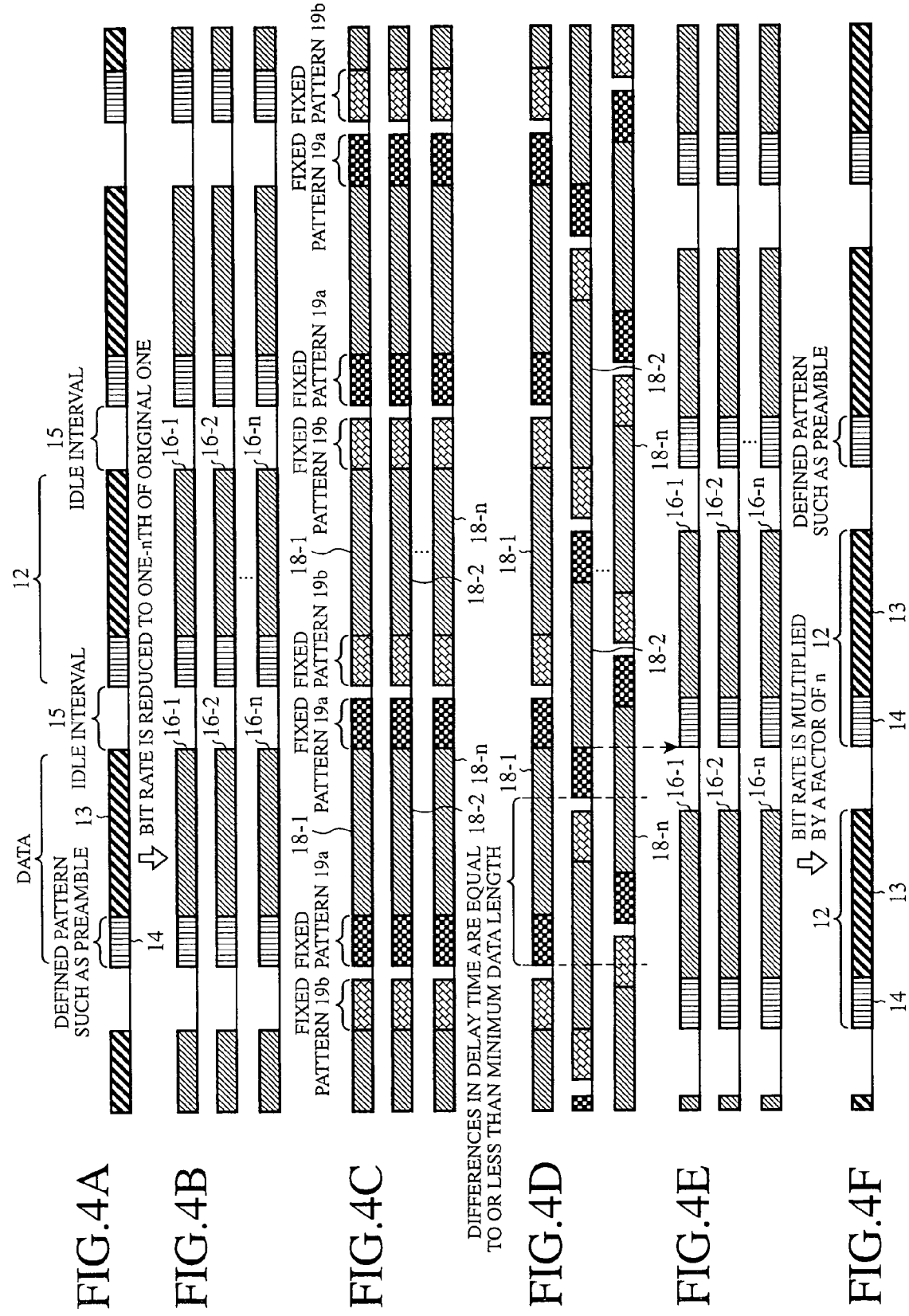

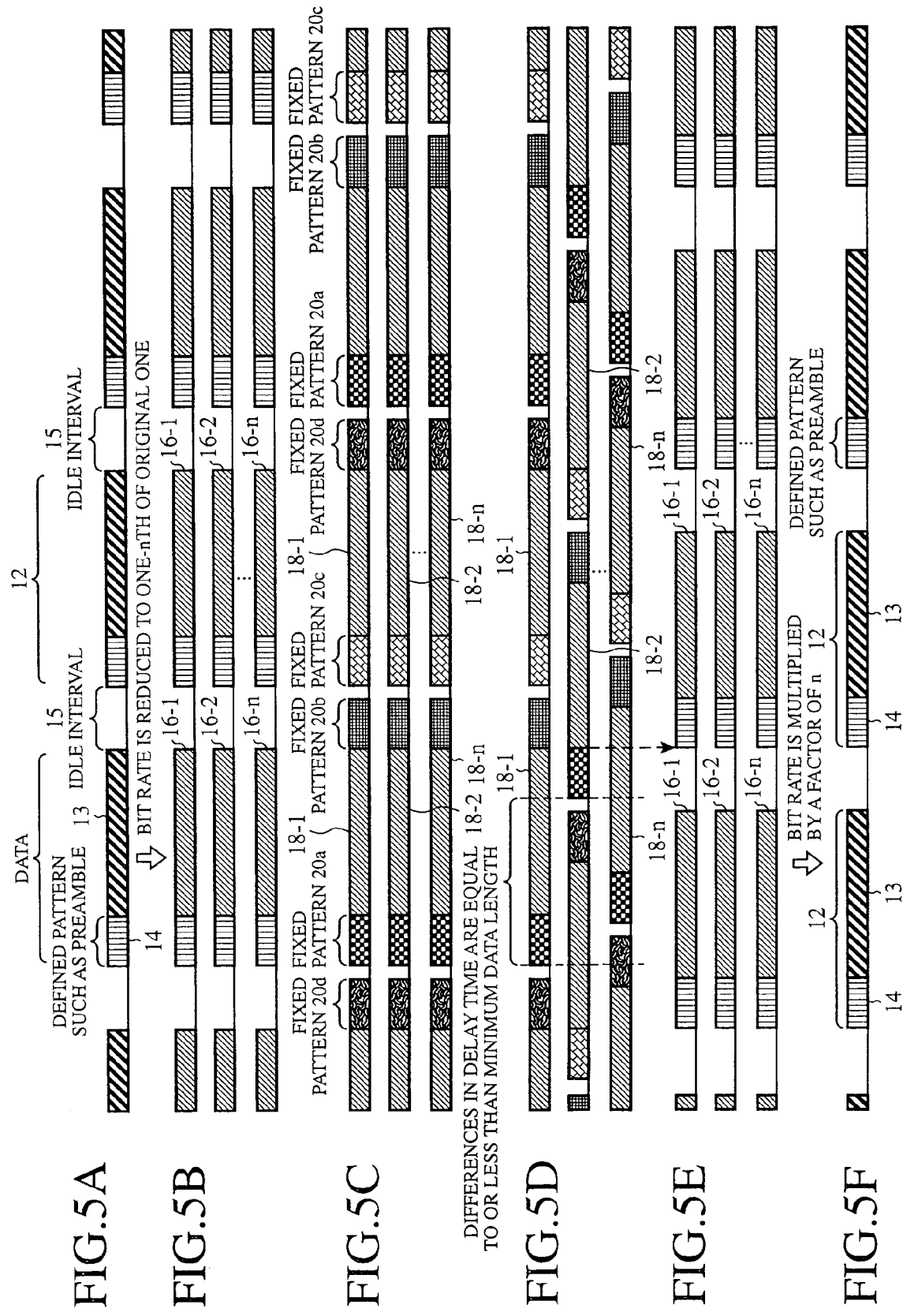

DATA TRANSMISSION METHOD, DATA TRANSMISSION APPARATUS AND DATA TRANSMISSION SYSTEM USING THIS METHOD

BACKGROUND OF THE INVENTION

1. Field of the Invention

The present invention relates to a data transmission method of transmitting high-speed data which are transmitted via a network channel, such as a LAN, to another network channel which is disposed in a moving object or the like and is physically separated from the above-mentioned network channel, by dividing the high-speed data into two or more low-speed data, so that the high-speed data can be used in the other network channel. It also relates to a data transmission apparatus and a data transmission system using the data transmission method.

2. Description of Related Art

In general, when a large amount of such high-speed data as text data and image data is transmitted from a network on the transmit side to another network on the receive side, an attempt to transmit such a large amount of high-speed data while maintaining the transfer rate of the network on the transmit side causes a necessity to provide electronic parts which can carry out high-speed processing with each of the two networks on the transmit side and on the receive side and increases the complexity and cost of the system. Then, in a radio communications system for transmitting such high-speed data using a wireless LAN, a data transmission method of dividing high-speed data into two or more low-speed data and transmitting them is adopted in order to reduce the total cost required to construct the system, for example.

In addition, since those two or more low-speed data into which the original high-speed data is divided and which are transmitted to the other network on the receive side have different delay times dependent upon the conditions of the transmission path and so on, processes of adding a bit (i.e., a framing bit) for delay detection and compensation to each of the two or more low-speed data, determining the differences in delay time among these low-speed data by comparison among the positions of the framing bits respectively added to the two or more low-speed data, and adjusting the delay times are performed on the two or more low-speed data in order to return the positions of all bits of each of the two or more low-speed data which have been shifted due to the delay time differences to the original positions.

[Patent reference 1] Japanese patent application publication (TOKKAI) No. 2002-191073 (see pp. 2 to 4 and FIG. 1)

[Patent reference 2] Japanese patent application publication (TOKKAI) No. 2002-135304 (see pp. 2, and 4 to 6, and FIGS. 1 to 3)

[Patent reference 3] Japanese patent application publication (TOKKAI) No. 2000-92146 (see pp. 2 to 4 and FIGS. 1 to 5)

A problem with the above-mentioned prior art data transmission method is however that since a bit (i.e., a framing bit) for delay detection and compensation is added to each of two or more low-speed data into which original high-speed data is divided, while differences in delay time among the two or more low-speed data can be compensated for, when a source network channel in which transmission of yet-to-be-divided high-speed data is carried out is used at a transfer rate close to the wire rate, a buffer overflow of the data occurs and all data cannot be transmitted from the network channel on the transmit side to another network channel at the receive side. In other words, the wire-rate performance of the source network channel cannot be ensured.

The wire rate of a network channel means a maximum transfer rate of the network channel in consideration of control data and so on. Although it is necessary to increase the processing speed as the amount of control data added to data to be transmitted increases, it is impossible to increase the processing speed and an overflow of the data occurs when the source network channel is being used at a transfer rate close to the wire rate.

SUMMARY OF THE INVENTION

The present invention is made in order to solve the above-mentioned problems, and it is therefore an object of the present invention to provide a data transmission method capable of, even if a source network channel in which high-speed data is transmitted is being used at a transfer rate close to wire rate, compensating for differences in delay time among two or more low-speed data into which the high-speed data is divided and which are transmitted from the source network channel to another network channel without affecting the wire-rate performance of the source network channel, and a data transmission apparatus and a data transmission system using the data transmission method.

In accordance with an aspect of the present invention, there is provided a data transmission method of transmitting a high-speed data signal, in which two or more data are disposed and separated by no-signal intervals each having a predetermined data length, from a transmit station connected to a network to a receive station connected to another network, the method including: a dividing step of dividing each of the plurality of data into two or more low-speed data so as to create two or more sequences of low-speed data which are separated by no-signal intervals each having the predetermined data length; a fixed-pattern adding step of adding a fixed pattern for detecting a head or an end of each low-speed data included in each of the two or more sequences of low-speed data to each of the no-signal intervals included in each of the two or more sequences of low-speed data so as to create two or more sequences of fixed-pattern-added low-speed data; and a transmitting step of transmitting the two or more sequences of fixed-pattern-added low-speed data to the transmit station connected to the other network.

Therefore, according to the present invention, there can be provided a low-cost data transmission system in which, even if the network on the transmit side in which the high-speed data is transmitted is being used at a transfer rate close to wire rate, while the receiving system can compensate for the differences in delay time among the plurality of low-speed data transmitted thereto from the transmitting system, the wire-rate performance of the source network on the transmit side can be ensured without affecting the wire-rate performance of the source network. In addition, the data transmission system does not apply any load to the networks on the transmit side and on the receive side.

In accordance with another aspect of the present invention, there is provided a data transmission apparatus including: a data dividing unit for receiving a high-speed data signal, in which two or more data are disposed and separated by no-signal intervals each having a predetermined data length, and for dividing each of the plurality of data into two or more low-speed data so as to create two or more sequences of low-speed data which are separated by no-signal intervals each having the predetermined data length; a fixed-pattern adding unit for adding a fixed pattern for detecting a head or an end of each low-speed data included in each of the two or more sequences of low-speed data to each of the no-signal intervals included in each of the two or more sequences of low-speed data so as to create two or more sequences of fixed-pattern-added low-speed data; and a transmitting unit of transmitting the two or more sequences of fixed-pattern-added low-speed data to a network on a receive side.

In accordance with a further aspect of the present invention, there is provided a data transmission system for transmitting a high-speed data signal, in which two or more high-speed data are disposed and separated by no-signal intervals each having a predetermined data length, from a transmitting system connected to a network to a receiving system connected to another network, the transmitting system including a data dividing unit for dividing each of the two or more data into two or more low-speed data so as to create two or more sequences of low-speed data which are separated by no-signal intervals each having the predetermined data length, and a fixed-pattern adding unit for adding a fixed pattern for detecting a head or an end of each low-speed data included in each of the two or more sequences of low-speed data to each of the no-signal intervals included in each of the two or more sequences of low-speed data so as to create two or more sequences of fixed-pattern-added low-speed data, and the receiving system including a receiving unit for receiving the two or more sequences of fixed-pattern-added low-speed data, a fixed pattern removing unit for removing the fixed patterns from each fixed-pattern-added low-speed data included in each of the two or more sequences of fixed-pattern-added low-speed data so as to extract the two or more sequences of low-speed data, and a reproducing unit for reproducing the two or more high-speed data from the two or more sequences of low-speed data extracted by the fixed pattern removing unit, and for sending out the two or more high-speed data onto the other network.

Further objects and advantages of the present invention will be apparent from the following description of the preferred embodiments of the invention as illustrated in the accompanying drawings.

BRIEF DESCRIPTION OF THE DRAWINGS

FIGS. 3A to 3F are data structure diagrams for explaining a series of processes performed by the data transmission system to which the data transmission method according to embodiment 1;

FIGS. 4A to 4F are data structure diagrams for explaining a series of processes performed by the data transmission system to which the data transmission method according to embodiment 2;

FIGS. 5A to 5F are data structure diagrams for explaining a series of processes performed by the data transmission system to which the data transmission method according to embodiment 3.

DETAILED DESCRIPTION OF THE PREFERRED EMBODIMENTS

Embodiment 1

Figure 1:
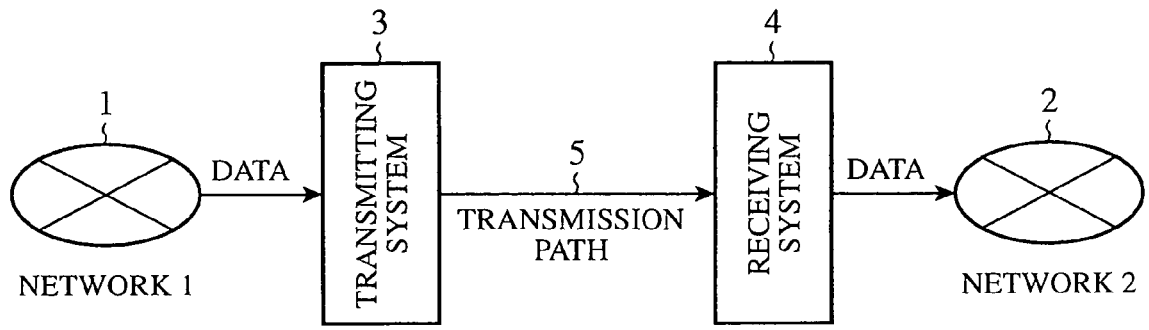
FIG. 1 is an outline diagram showing a configuration outline of a data transmission system to which a data transmission method according to either of embodiments 1 to 3 is applied.

Hereafter, a data transmission method according to embodiment 1 of the present invention will be explained with reference to FIGS. 1 to 4. FIG. 1 is an outline diagram showing a configuration outline of a data transmission system for transmitting high-speed data by using the data transmission method according to embodiment 1, FIG. 2A is a block diagram showing the concrete structure of a transmitting system of the data transmission system shown in FIG. 1, and FIG. 2B is a block diagram showing the concrete structure of a receiving system of the data transmission system shown in FIG. 1.

In FIG. 1, reference numerals 1 and 2 denote network channels (referred to as networks from here on) each of which is comprised of a communication line, such as a LAN (Local Area Network), reference numeral 3 denotes the transmitting system connected to the network 1, for dividing high-speed data which is transmitted in the network 1 into two or more low-speed data and for outputting them, reference numeral 4 denotes the receiving system connected to the network 2, for reproducing the original high-speed data from the two or more low-speed data transmitted thereto from the transmitting system 3, and for sending out the original high-speed data onto the network 2, and reference numeral 5 denotes a transmission path running between the transmitting system 3 and the receiving system 4. The transmission path 5 can be constructed of either a cable or a radio channel. For example, when one of the two networks is installed in a moving object, such as a vehicle or a train, the transmission path 5 consists of a radio channel. Furthermore, when a large amount of image data and so on is transmitted by radio between the transmitting system 3 and the receiving system 4, it is desirable to use millimeter-wave radio transmission equipment. In such a case, a millimeter-wave transmitter and a millimeter-wave receiver that operate in a frequency band of, for example, 60 GHz are used as the transmitting unit 8 and the receiving unit 9 which are mentioned later in detail, respectively.

In addition, the data transmission system according to embodiment 1 is based on data communications between networks which comply with communication standards which are usually applied to LANs or the like. Transmission speed, communication procedures, etc. are defined by such communication standards as for high-speed data transmitted in either of the network 1 and the network 2, high-speed data transmitted between the network 1 and the transmitting system 3, and high-speed data transmitted between the network 2 and the receiving systems 4. The data transmission method according to the present invention can be applied to communications between any two networks when a so-called idol interval is inserted between any two adjacent high-speed data and communication standards which defines a minimum value of this idol interval are applied to the networks.

Figure 2A:
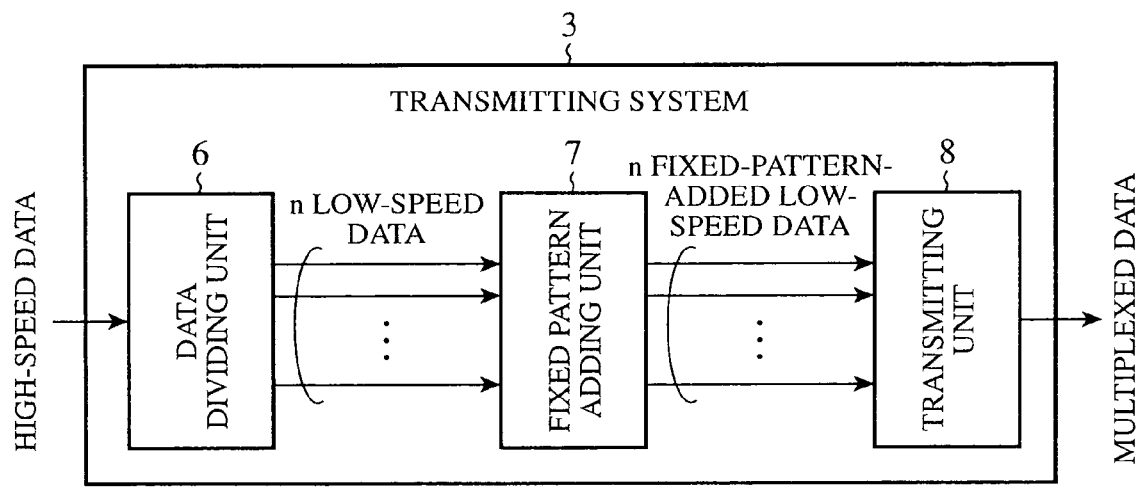
FIG. 2A is a block diagram showing the concrete structure of a transmitting system of the data transmission system shown in FIG. 1.
Figure 2B:
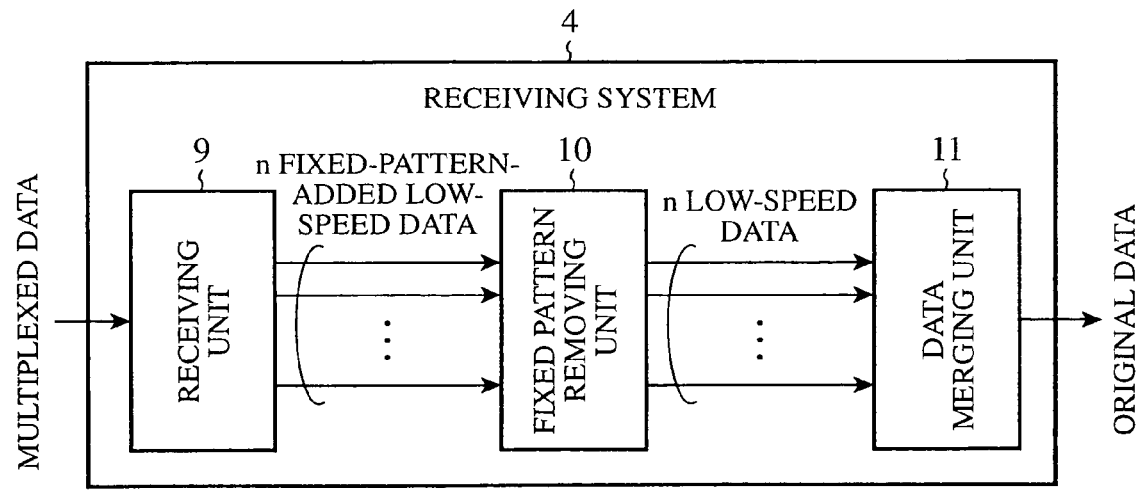
FIG. 2B is a block diagram showing the concrete structure of a receiving system of the data transmission system shown in FIG. 1.

In FIG. 2A, reference numeral 6 denotes a data dividing unit for dividing high-speed data inputted thereto via the network 1 into n low-speed data (having a bit rate that is 1/n of that of the high-speed data) according to the preset division number n (n is an integer equal to or larger than 2), reference numeral 7 denotes a fixed pattern adding unit for adding predetermined fixed patterns each for detecting a head or an end of low-speed data, which are mentioned below, to each of the n low-speed data into which the high-speed data is divided by the data dividing unit 6, and reference numeral 8 denotes a transmitting unit for multiplexing the n low-speed data to which the fixed patterns are respectively added by the fixed pattern adding unit 7 (referred to as fixed-pattern-added low-speed data from here on), and for sending out the multiplexed n fixed-pattern-added low-speed data onto the transmission path 5. That is, the transmitting unit 8 shown in FIG. 2A multiplexes the n fixed-pattern-added low-speed data and sends out them onto the transmission path 5. As an alternative, the transmitting unit 8 can transmit such the two or more fixed-pattern-added low-speed data by using as many transmitting units as the number of fixed-pattern-added low-speed data. In this case, the plurality of transmitting units send out the plurality of fixed-pattern-added low-speed data onto the transmission path 5 by way of different channels.

In FIG. 2B, reference numeral 9 denotes a receiving unit for receiving the multiplexed low-speed data transmitted thereto from the transmitting system 3 by way of the transmission path 5, and for demultiplexing them into the n fixed-pattern-added low-speed data, reference numeral 10 denotes a fixed pattern removing unit for extracting the head of each of the n fixed-pattern-added low-speed data sent thereto from the receiving unit 9, for removing the fixed pattern added to the head of each of the n fixed-pattern-added low-speed data when the heads of all the n fixed-pattern-added low-speed data demultiplexed by the receiving unit 9 have been extracted, and for arranging and outputting the n low-speed data with the heads of these low-speed data being in synchronization with one another, and reference numeral 11 denotes a data merging unit for reproducing the single original high-speed data by merging the n low-speed data outputted thereto with the heads of these low-speed data being in synchronization with one another from the fixed pattern removing unit 10, and for sending out the original high-speed data onto the network 2. The receiving unit 9 shown in FIG. 2B demultiplexes the n multiplexed fixed-pattern-added low-speed data so as to extract each of the n fixed-pattern-added low-speed data. When the transmitting system 3 is equipped with two or more transmitting units, as mentioned above, the receiving system 4 is similarly equipped with two or more corresponding receiving units for receiving the two or more fixed-pattern-added low-speed data, respectively.

Figures 3A, 3B, 3C, 3D, 3E, 3F:
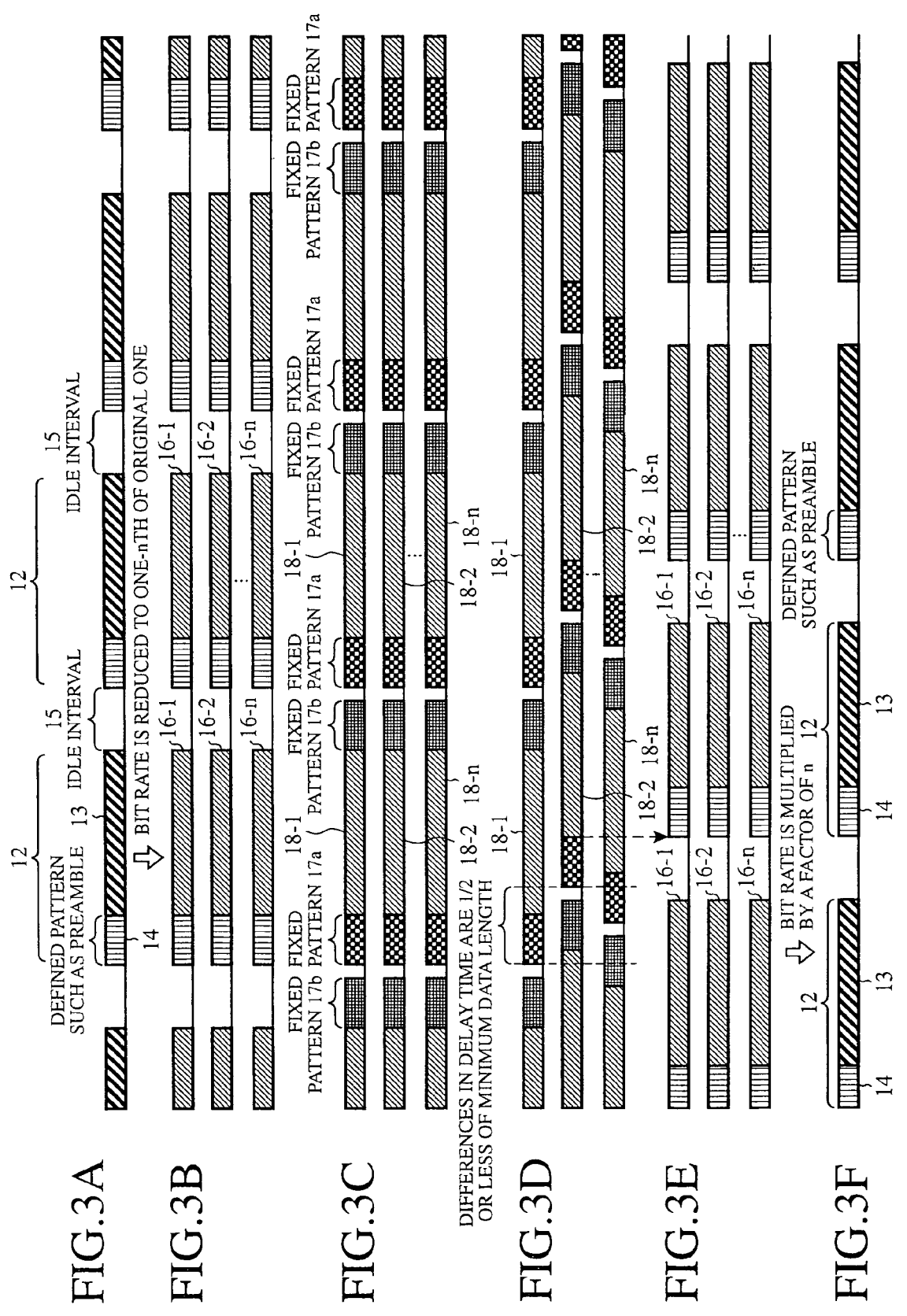

Next, the operation of the data transmission system will be explained in detail with reference to FIGS. 3A to 3F. FIGS. 3A to 3F are data structure diagrams for explaining a series of processes performed by the data transmission system according to embodiment 1. FIG. 3A is a diagram showing the structure of high-speed data inputted into the data dividing unit 6 of the transmitting system 3 via the network 1, FIG. 3B is a diagram showing the structure of n low-speed data into which high-speed data is divided by the data dividing unit 6, FIG. 3C is a diagram showing n fixed-pattern-added low-speed data which are the n low-speed data to each of which fixed patterns are added by the fixed pattern adding unit 7, FIG. 3D is a diagram showing the n fixed-pattern-added low-speed data which are sent out onto the transmission path 5 by the transmitting system 3, and which are received by the receiving system 4, FIG. 3E is a diagram showing the n low-speed data in each of which the fixed patterns are removed by the fixed pattern removing unit 10, the heads of the n low-speed data being adjusted by the fixed pattern removing unit 10, and FIG. 3F is a diagram showing the high-speed data which is reproduced by the data merging unit 11 and is sent out onto the network 2.

When transmitting a plurality of high-speed data 12 as shown in FIG. 3A from the network 1 to the other network 2, the high-speed data 12 is inputted into the data dividing unit 6 of the transmitting system 3 via the network 1. Each of the plurality of high-speed data 12 has a data portion 13 which is a part including information, and a defined pattern 14, such as a preamble, which is control information added to the data portion 13. Concretely, each of the plurality of high-speed data 12 is frame data or the like in which frame information is added to one of blocks, such as packets, into which high-speed data is divided. A no-signal interval 15, which is called an idle interval, is provided between any two adjacent ones of those high-speed data 12 so that the high-speed data 12 are separated by no-signal intervals. These idle intervals 15 have a minimum data length which is defined by the communication standards with which the network 1 complies.

When receiving the plurality of high-speed data 12 inputted thereto, the data dividing unit 6 divides each of the plurality of high-speed data into n low-speed data 16-1 to 16-*n*, as shown in FIG. 3B, having a bit rate which is 1/n of that of the high-speed data (n is an integer equal to or larger than 2), and outputs them to the fixed pattern adding unit 7. When receiving the n low-speed data 16-1 to 16-*n* inputted thereto, the fixed pattern adding unit 7 provides fixed patterns 17*a* and 17*b* to the head and end of each of the n low-speed data 16-1 to 16-*n* so as to create n fixed-pattern-added low-speed data 18-1 to 18-*n* as shown in FIG. 3C, and then outputs them to the transmitting unit 8.

If a defined pattern, such as a preamble, is already given to the head or end of each of the n low-speed data 16-1 to 16-*n* when adding the fixed patterns 17*a* and 17*b* to the head and end of each of them, the fixed pattern adding unit 7 overwrites the defined pattern with the fixed pattern 17*a* or 17*b*. According to the data transmission method according to embodiment 1, a defined pattern, such as a preamble, of the head of each low-speed data is overwritten with the fixed pattern 17*a* to be added to each low-speed data, and the fixed pattern 17*b* to be added to the end of each low-speed data is written or incorporated into an idle interval just behind each low-speed data. As shown in FIG. 3C, the different fixed patterns 17*a* and 17*b* are added to the head and end of each of the n low-speed data 16-1 to 16-*n*.

When receiving the n fixed-pattern-added low-speed data 18-1 to 18-*n* inputted thereto, the transmitting unit 8 multiplexes these fixed-pattern-added low-speed data and then sends out them onto the transmission path 5. The multiplexed fixed-pattern-added low-speed data outputted from the transmitting unit 8 are then transmitted to the receiving unit 9 of the receiving system 3 via the transmission path 5.

When receiving the multiplexed data, i.e., the multiplexed fixed-pattern-added low-speed data transmitted thereto via the transmission path 5, the receiving unit 9 demultiplexes the multiplexed data into the n fixed-pattern-added low-speed data 18-1 to 18-*n* and then outputs them to the fixed pattern removing unit 10. Differences in delay time, as shown in FIG. 3D, resulting from variations in the characteristics of all components of the system, changes of the transmission path, etc. have occurred among the fixed-pattern-added low-speed data 18-1 to 18-*n* outputted from the receiving unit 9. The n fixed-pattern-added low-speed data 18-1 to 18-*n* having such different delay times are delivered to the fixed pattern removing unit 10.

With the assumption that the differences in delay time among the fixed-pattern-added low-speed data 18-1 to 18-*n* are equal to or smaller than one-half of the minimum data length, the fixed pattern removing unit 10 checks a correlation between each of the received n fixed-pattern-added low-speed data and the fixed pattern 17*a* added to the head of each of the received n fixed-pattern-added low-speed data. The fixed pattern removing unit 10 can extract the head of each of the n low-speed data by performing the correlation checking. Then, after the fixed pattern removing unit 10 has extracted the heads of all then fixed-pattern-added low-speed data 18-1 to 18-$n$, the fixed pattern removing unit 10 removes the fixed pattern 17$a$ added to the head of each of the n fixed-pattern-added low-speed data 18-1 to 18-$n$, and starts outputting the n low-speed data 16-1 to 16-$n$ to the data merging unit 11 with the heads of the n low-speed data being in synchronization with one another. The fixed pattern removing unit 10 further determines the ends of the n low-speed data 16-1 to 16-$n$ by checking a correlation between each of the received fixed-pattern-added low-speed data and fixed pattern 17$b$ provided to the end of each of the received fixed-pattern-added low-speed data. The fixed pattern removing unit 10 can extract the end of each of the n low-speed data by performing the correlation checking. Then, after the fixed pattern removing unit 10 has extracted the ends of all the low-speed data 16-1 to 16-$n$, the fixed pattern removing unit 10 stops the output of them to the data merging unit 11.

FIG. 3E shows the low-speed data 16-1 to 16-$n$ outputted from the fixed pattern removing unit 10. The differences in delay time among the fixed-pattern-added low-speed data 18-1 to 18-$n$ received by the receiving system 4 are compensated for by the fixed pattern removing unit 10, as mentioned above. When the fixed pattern adding unit 7 of the transmitting system 3 overwrites a defined pattern, such as a preamble, at the head or the end of each of the n low-speed data with a fixed pattern, the fixed pattern removing unit 10 also reproduces the defined pattern when removing the fixed patterns 17$a$ and 17$b$ added to each of the n low-speed data. When receiving the n low-speed data 16-1 to 16-$n$ outputted thereto from the fixed pattern removing unit 10, the data merging unit 11 reproduces the original high-speed data 12 as shown in FIG. 3F from these low-speed data 16-1 to 16-$n$, and sends out the original high-speed data onto the network 2.

As mentioned above, according to the data transmission method according to embodiment 1, the receiving system 4 can compensate for the differences in delay time among the plurality of low-speed data transmitted from the transmitting system 3 which are equal to or less than one-half of the minimum data length. In addition, since the data dividing unit 6 adds a fixed pattern to each or either of the head and end of each of the n low-speed data 16-1 to 16-$n$ into which the high-speed data is divided by using an idle interval 15, the division of the original high-speed data into the plurality of low-speed data and the reproduction of the original high-speed data can be carried out while the wire-rate performance of the source network channel is ensured. Therefore, a low-cost data transmission system which applies no load to the networks can be constructed.

For example, when the data length of each high-speed data 12 becomes shortened, or more concretely, when each high-speed data is constructed of a short packet having a short data length, the number of times that complicated packet processing is carried out increases as compared with a case where each high-speed data is constructed of a long packet and it becomes difficult to use the network channel at a transfer rate to wire rate. In contrast, according to the data transmission method according to embodiment 1, since a fixed pattern used for compensating for the differences in delay time among the plurality of low-speed data into which the high-speed is divided is disposed in an idle interval between any two adjacent ones of the plurality of low-speed data, the division of the original high-speed data into the plurality of low-speed data and the reproduction of the original high-speed data 12 can be carried out while the wire-rate performance of the source network channel is ensured, regardless of the data length of the high-speed data 12. Since a communication method of transmitting data between the transmitting system 3 and the receiving system 4 can be provided independently of the communication standards with which the networks 1 and 2 comply, respectively, the incorporation of a fixed pattern into each idle interval 15 provided between any two adjacent ones of the plurality of low-speed data into which the high-speed data is divided, as shown in FIG. 3C, does not produce any trouble.

The data transmission system according to embodiment 1 performs data transmission from the network 1 to the network 2, as described above. The data transmission system according to embodiment 1 can be so constructed as to also perform data transmission from the network 2 to the network 1. In other words, the data transmission system according to embodiment 1 can be a two-way communication system in which both the transmitting system 3 and the receiving system 4 are disposed in each of the networks 1 and 2.

Embodiment 2

Next, a data transmission method according to embodiment 2 of the present invention will be explained. A data transmission system to which the data transmission method according to embodiment 2 is applied has the same structure as that according to above-mentioned embodiment 1 shown in FIGS. 1, 2A and 2B. The operation of the data transmission system according to embodiment 2 will be explained with reference to FIGS. 4A to 4F. FIGS. 4A to 4F are diagrams for explaining a series of processes performed by the data transmission system according to embodiment 2. The data transmission method according to embodiment 2 differs from that according to embodiment 1 in that fixed patterns which are added to each low-speed data by a fixed pattern adding unit 7 differs from those of embodiment 2. Hereafter, the operation of the data transmission system according to embodiment 2 will be explained focusing on the addition of fixed patterns performed by the fixed pattern adding unit. 7. Except for the addition of fixed patterns by the fixed pattern adding unit 7, the data transmission system according to embodiment 2 operates in the same way as that of embodiment 1, and therefore the explanation of the same processes as those of embodiments 1 and 2 will be omitted hereafter.

FIG. 4A is a diagram showing the structure of high-speed data inputted into a data dividing unit 6 of a transmitting system 3 via a network 1, FIG. 4B is a diagram showing the structure of n low-speed data into which the high-speed data is divided by the data dividing unit 6, FIG. 4C is a diagram showing n fixed-pattern-added low-speed data which are the n low-speed data to which fixed patterns are added by the fixed pattern adding unit 7, FIG. 4D is a diagram showing the n fixed-pattern-added low-speed data which are sent out onto a transmission path 5 by the transmitting system 3, and which are received by a receiving system 4, FIG. 4E is a diagram showing the n low-speed data in which the fixed patterns are removed by a fixed pattern removing unit 10 and the heads of the n low-speed data are adjusted by the fixed pattern removing unit 10, and FIG. 4F is a diagram showing the high-speed data which is reproduced by a data merging unit 11 and is sent out onto another network 2.

When receiving the n low-speed data 16-1 to 16-$n$ inputted thereto, the fixed pattern adding unit 7 adds an identical fixed pattern 19$a$ to each of the head and end of each of the n low-speed data 16-1 to 16-$n$ so as to create fixed-pattern-added low-speed data 18-1 to 18-$n$ as shown in FIG. 4C, and then outputs them to a transmitting unit 8. When then receiving the next set of n low-speed data 16-1 to 16-$n$, the fixed pattern adding unit 7 adds a fixed pattern 19$b$ different from the fixed pattern 19$a$ to each of the head and end of each of the n low-speed data 16-1 to 16-$n$. After that, the fixed pattern adding unit 7 alternately adds the two different fixed patterns 19b and 19a to each of the head and end of each of n low-speed data 16-1 to 16-n until all sets of low-speed data 16-1 to 16-n are processed, as shown in FIG. 4C.

If a defined pattern, such as a preamble, is already given to the head or end of each of the n low-speed data 16-1 to 16-n when adding the fixed pattern 19a or 19b to each of the head and end of each of the n low-speed data, the fixed pattern adding unit 7 overwrites the defined pattern with the fixed pattern 19a or 19b. According to the data transmission method according to embodiment 2, a defined pattern, such as a preamble, already given to the head of each of the n low-speed data is overwritten with the fixed pattern 19a or 19b to be added to each low-speed data, and the fixed pattern 19a or 19b to be added to the end of each low-speed data is written or incorporated into an idle interval just behind each low-speed data.

When receiving the n fixed-pattern-added low-speed data 18-1 to 18-n inputted thereto, the transmitting unit 8 multiplexes these low-speed data and then sends out them onto the transmission path 5. The multiplexing data outputted from the transmitting unit 8 are transmitted to a receiving unit 9 of the receiving system 3 via the transmission path 5.

Differences in delay time, as shown in FIG. 4D, resulting from variations in the characteristics of all components of the system, changes of the transmission path, etc. have occurred among the fixed-pattern-added low-speed data 18-1 to 18-n outputted from the receiving unit 9. The fixed-pattern-added low-speed data 18-1 to 18-n having such different delay times are outputted to the fixed pattern removing unit 10. With the assumption that the differences in delay time among the fixed-pattern-added low-speed data 18-1 to 18-n are equal to or smaller than a minimum data length, the fixed pattern removing unit 10 checks a correlation between each received fixed-pattern-added low-speed data and the fixed pattern 19a or 19b added to the head of each received fixed-pattern-added low-speed data. The fixed pattern removing unit 10 can extract the head of each low-speed data by performing the correlation checking.

Then, after the fixed pattern removing unit 10 has extracted the heads of all the n fixed-pattern-added low-speed data 18-1 to 18-n, the fixed pattern removing unit 10 removes the fixed pattern 19a or 19b added to the head of each of the n fixed-pattern-added low-speed data 18-1 to 18-n, and starts outputting the n low-speed data 16-1 to 16-n to the data merging unit 11 with the heads of the n low-speed data 16-1 to 16-n being in synchronization with one another. The fixed pattern removing unit 10 further determines the ends of the n low-speed data 16-1 to 16-n by checking a correlation between each of the received fixed-pattern-added low-speed data and the fixed pattern 19a or 19b added to the end of each of the received fixed-pattern-added low-speed data. The fixed pattern removing unit 10 can extract the end of each low-speed data by performing the correlation checking. Then, after the fixed pattern removing unit 10 has extracted the ends of all the low-speed data 16-1 to 16-n, the fixed pattern removing unit 10 stops the output of them to the data merging unit 11.

FIG. 4E shows the low-speed data 16-1 to 16-n outputted from the fixed pattern removing unit 10. The differences in delay time among the fixed-pattern-added low-speed data 18-1 to 18-n received by the receiving system 4 are compensated for by the fixed pattern removing unit 10, as mentioned above. When the fixed pattern adding unit 7 of the transmitting system 3 overwrites a defined pattern, such as a preamble, at the head or end of each of the n low-speed data with a fixed pattern, the fixed pattern removing unit 10 also reproduces the defined pattern when removing the fixed patterns 19a and 19b added to each of the n low-speed data. When receiving the n low-speed data 16-1 to 16-n outputted thereto from the fixed pattern removing unit 10, the data merging unit 11 reproduces the original high-speed data 12 as shown in FIG. 4F from these n low-speed data 16-1 to 16-n, and sends out the original high-speed data onto the other network 2.

As mentioned above, according to the data transmission method according to embodiment 2, the receiving system 4 can compensate for the differences in delay time among the plurality of low-speed data transmitted from the transmitting system 3 which are equal to or less than the minimum data length. In addition, since the data dividing unit 6 adds a fixed pattern to each or either of the head and end of each of the n low-speed data 16-1 to 16-n into which the high-speed data is divided by using an idle interval 15, the division of the original high-speed data into the plurality of low-speed data and the reproduction of the original high-speed data can be carried out while the wire-rate performance of the source network channel is ensured. Therefore, a low-cost data transmission system which applies no load to the networks can be constructed.

According to the data transmission method according to embodiment 2, since a fixed pattern used for compensating for the differences in delay time among the plurality of low-speed data into which the high-speed is divided can be disposed in each idle interval between any two adjacent ones of the plurality of low-speed data, the division of the original high-speed data into the plurality of low-speed data and the reproduction of the original high-speed data 12 can be carried out while the wire-rate performance of the source network channel is ensured, regardless of the data length of the high-speed data 12. In addition, the data transmission system according to embodiment 2 can be a two-way communication system in which both the transmitting system 3 and the receiving system 4 are disposed in each of the networks 1 and 2, like that of embodiment 1.

Embodiment 3

Next, a data transmission method according to embodiment 3 of the present invention will be explained. A data transmission system to which the data transmission method according to embodiment 3 is applied has the same structure as those according to above-mentioned embodiments 1 and 2 shown in FIGS. 1, 2A and 2B. The operation of the data transmission system according to embodiment 3 will be explained with reference to FIGS. 5A to 5F. FIGS. 5A to 5F are diagrams for explaining a series of processes performed by the data transmission system according to embodiment 3. The data transmission method according to embodiment 3 differs from those according to above-mentioned embodiments 1 and 2 in that fixed patterns which are added to each low-speed data by a fixed pattern adding unit 7 differs from those of embodiments 1 and 2. Hereafter, the operation of the data transmission system according to embodiment 3 will be explained focusing on the addition of fixed patterns by the fixed pattern adding unit 7. Except for the addition of fixed patterns by the fixed pattern adding unit 7, the data transmission system according to embodiment 3 operates in the same way as that of embodiment 1 or 2, and therefore the explanation of the same processes as those of embodiments 1 and 2 will be omitted hereafter.

FIG. 5A is a diagram showing the structure of high-speed data inputted into a data dividing unit 6 of a transmitting system 3 via a network 1, FIG. 5B is a diagram showing the structure of n low-speed data into which the high-speed data is divided by the data dividing unit 6, FIG. 5C is a diagram showing n fixed-pattern-added low-speed data which are the n low-speed data to which fixed patterns are added by the fixed pattern adding unit 7, FIG. 5D is a diagram showing the n fixed-pattern-added low-speed data which are sent out onto a transmission path 5 by the transmitting system 3, and which are received by a receiving system 4, FIG. 5E is a diagram showing the n low-speed data in which the fixed patterns are removed by a fixed pattern removing unit 10 and the heads of the n low-speed data are adjusted by the fixed pattern removing unit 10, and FIG. 5F is a diagram showing the high-speed data which is reproduced by a data merging unit 11 and is sent out onto another network 2.

When receiving the n low-speed data 16-1 to 16-$n$ inputted thereto, the fixed pattern adding unit 7 writes or incorporates different fixed patterns 20$a$ and 20$b$ into idle intervals before and behind the head and end of each of the n low-speed data 16-1 to 16-$n$, respectively, so as to create fixed-pattern-added low-speed data 18-1 to 18-$n$ as shown in FIG. 4C, and then outputs them to a transmitting unit 8. When then receiving the next n low-speed data 16-1 to 16-$n$, the fixed pattern adding unit 7 writes or incorporates different fixed pattern 20$c$ and 20$d$, which differ from the former fixed patterns 20$a$ and 20$b$, into idle intervals before and behind the head and end of each of the next n low-speed data 16-1 to 16-$n$. After that, the fixed pattern adding unit 7 alternately adds the different fixed patterns 20$a$ and 20$b$ and the other different fixed patterns 20$c$ and 20$d$ to the head and end of each of n low-speed data 16-1 to 16-$n$ until all sets of low-speed data 16-1 to 16-$n$ are processed, as shown in FIG. 5C.

If a defined pattern, such as a preamble, is already given to the head or end of each of the n low-speed data 16-1 to 16-$n$ when adding the fixed pattern 20$a$-20$d$ to each of the head and end of each of the n low-speed data, the fixed pattern adding unit 7 overwrites the defined pattern with the fixed pattern 20$a$ or 20$d$. According to the data transmission method according to embodiment 2, a defined pattern, such as a preamble, of the head of each low-speed data is overwritten with the fixed pattern 20$a$ or 20$d$ to be added to each low-speed data, and the fixed pattern 20$b$ or 20$d$ to be added the end of each low-speed data is written or incorporated into an idle interval just behind each low-speed data.

In other words, according to this embodiment 3, 2 m different fixed patterns are used, and two different fixed patterns are added to the head and end of each of m contiguous low-speed data, respectively, and the above-mentioned 2 m different fixed patterns are repeatedly used for every contiguous sequence of m data. The example shown above is the case of m=2.

When receiving the n fixed-pattern-added low-speed data 18-1 to 18-$n$ inputted thereto, the transmitting unit 8 multiplexes these low-speed data and then sends out them onto the transmission path 5. The multiplexed data outputted from the transmitting unit 8 are transmitted to a receiving unit 9 of the receiving system 3 via the transmission path 5.

Differences in delay time, as shown in FIG. 5D, resulting from variations in the characteristics of all components of the system, changes of the transmission path, etc. have occurred among the fixed-pattern-added low-speed data 18-1 to 18-$n$ outputted from the receiving unit 9. The fixed-pattern-added low-speed data 18-1 to 18-$n$ having such different delay times are outputted to the fixed pattern removing unit 10. With the assumption that the differences in delay time among these fixed-pattern-added low-speed data 18-1 to 18-$n$ are equal to or smaller than a minimum data length multiplied by (m−1), the fixed pattern removing unit 10 checks a correlation between each received fixed-pattern-added low-speed data and the fixed pattern 20$a$ or 20$c$ added to the head of each received fixed-pattern-added low-speed data. The fixed pattern removing unit 10 can extract the head of each low-speed data by performing the correlation checking.

Then, after the fixed pattern removing unit 10 has extracted the heads of all the n fixed-pattern-added low-speed data 18-1 to 18-$n$, the fixed pattern removing unit 10 removes the fixed pattern 20$a$ or 20$c$ added to the head of each of the n fixed-pattern-added low-speed data 18-1 to 18-$n$, and starts outputting the n low-speed data 16-1 to 16-$n$ to the data merging unit 11 with the heads of the n low-speed data being in synchronization with one another. The fixed pattern removing unit 10 further determines the ends of the n low-speed data 16-1 to 16-$n$ by checking a correlation between each of the received fixed-pattern-added low-speed data and the fixed pattern 20$b$ or 20$d$ added to the end of each of the received fixed-pattern-added low-speed data. The fixed pattern removing unit 10 can extract the end of each low-speed data by performing the correlation checking. Then, after the fixed pattern removing unit 10 has extracted the ends of all the low-speed data 16-1 to 16-$n$, the fixed pattern removing unit 10 stops the output of them to the data merging unit 11.

FIG. 5E shows the low-speed data 16-1 to 16-$n$ outputted from the fixed pattern removing unit 10. The differences in delay time among the fixed-pattern-added low-speed data 18-1 to 18-$n$ received by the receiving system 4 are compensated for by the fixed pattern removing unit 10, as mentioned above. When the fixed pattern adding unit 7 of the transmitting system 3 overwrites a defined pattern, such as a preamble, at the head of each of the n low-speed data with a fixed pattern, the fixed pattern removing unit 10 also reproduces the defined pattern when removing the fixed patterns 20$a$ and 20$b$, 20$c$ and 20$d$, or . . . added to each of the n low-speed data. When receiving the n low-speed data 16-1 to 16-$n$ outputted thereto from the fixed pattern removing unit 10, the data merging unit 11 reproduces the original high-speed data 12 as shown in FIG. 5F from these low-speed data 16-1 to 16-$n$, and sends out the original high-speed data onto the other network 2.

As mentioned above, according to the data transmission method according to embodiment 3, the receiving system 4 can compensate for the differences in delay time among the plurality of low-speed data transmitted from the transmitting system 3 which are equal to or less than the minimum data length. In addition, since the data dividing unit 6 adds a fixed pattern to each or either of the head and end of each of the n low-speed data 16-1 to 16-$n$ into which the high-speed data is divided by using an idle interval 15, the division of the original high-speed data into the plurality of low-speed data and the reproduction of the original high-speed data can be carried out while the wire-rate performance of the source network channel is ensured. Therefore, a low-cost data transmission system which applies no load to the networks can be constructed.

According to the data transmission method according to embodiment 3, since a fixed pattern used for compensating for the differences in delay time among the plurality of low-speed data into which the high-speed is divided can be disposed in each idle interval between any two adjacent ones of the plurality of low-speed data, the division of the original high-speed data into the plurality of low-speed data and the reproduction of the original high-speed data 12 can be carried out while the wire-rate performance of the source network channel is ensured, regardless of the data length of the high-speed data 12. In addition, the data transmission system according to embodiment 3 can be a two-way communication system in which both the transmitting system 3 and the receiving system 4 are disposed in each of the networks 1 and 2, like that of embodiment 1 or 2.

Embodiment 4

Figure 6:
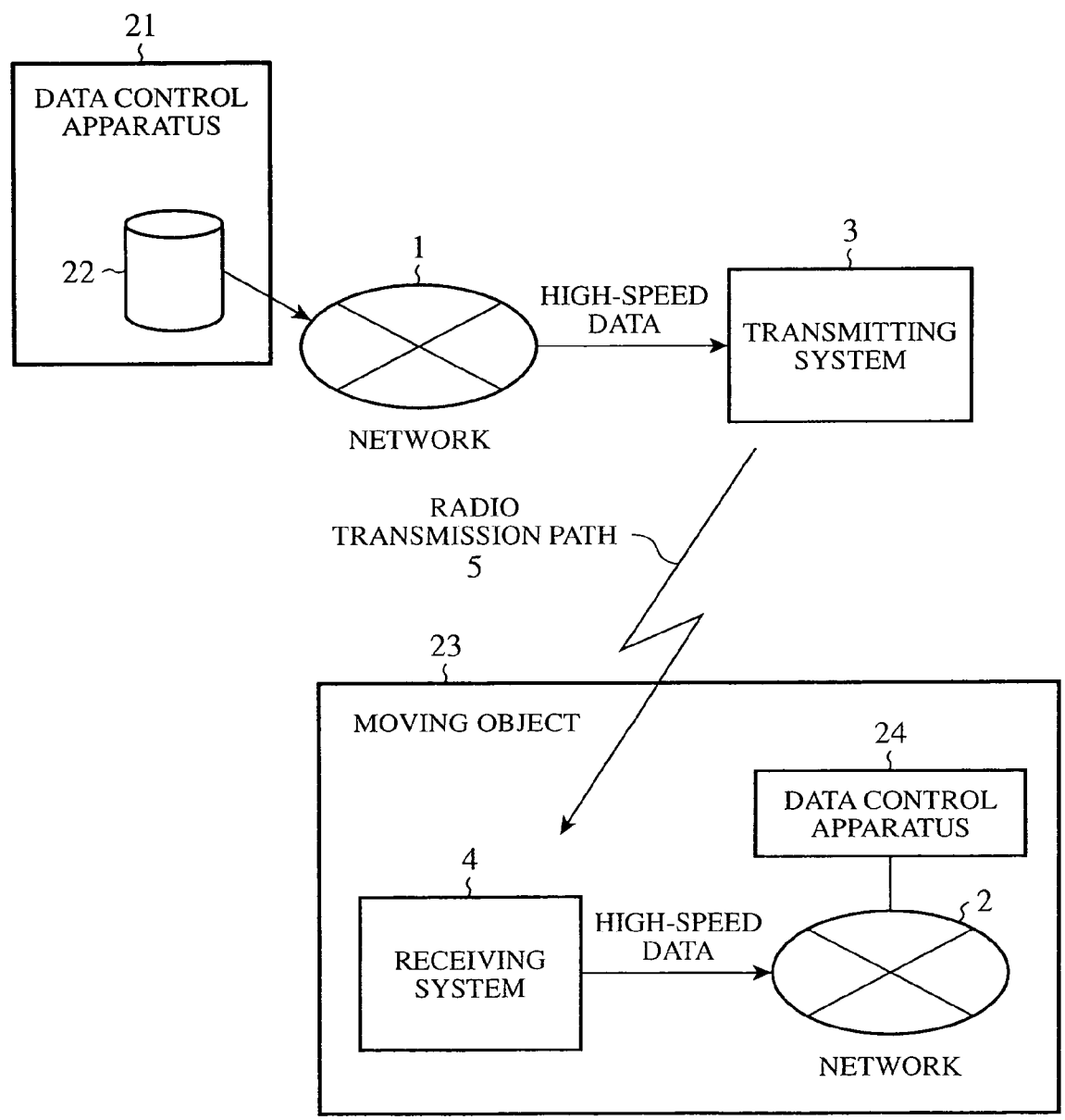
FIG. 6 is a block diagram showing the structure of a data transmission system according to embodiment 4.

Next, a data transmission system according to embodiment 4 of the present invention will be explained with reference to FIG. 6. FIG. 6 is a block diagram showing the structure of a concrete example of the data transmission system to which the data transmission method according to either of above-mentioned embodiments 1 to 3 is applied. In FIG. 6, reference numeral 21 denotes a data control apparatus connected to a network 1, for packetizing a large amount of text data, image data, etc. into packets of high-speed data according to communication standards with which the network 1 complies, and for sending out the packets onto the network 1, reference numeral 22 denotes a storage unit disposed in the data control apparatus 21, for temporarily storing the large amount of text data, image data, etc., reference numeral 23 denotes a moving object, such as a vehicle or a train, and reference numeral 24 denotes a data control apparatus disposed in the moving object 23 and provided with a storage unit for temporarily storing the original high-speed data which have been reproduced by a receiving system 4 and are sent out onto another network 2. In FIG. 6, the same reference numerals as shown in FIGS. 1, 2A and 2B denote the same components as explained in embodiment 1 or like components, and therefore the detailed explanation of these components will be omitted hereafter.

The data transmission system according to this embodiment 4 can transmit a large amount of text data, image data, etc. from a transmitting system 3 installed in a construction, such as a station platform, to the moving object 23, such as a train which is stopping at or passing the station platform, by way of a radio transmission path 5, and enables users to use these various data in the moving object 23 (e.g., to view and listen, or peruse the various data by using terminal equipment, such as a personal computer). As an alternative, the data transmission system according to this embodiment 4 can transmit a large amount of text data, image data, etc. from the transmitting system 3 installed in a construction, such as a highway tollgate or a gas station, to the moving object 23, such as a vehicle which is stopping at the highway tollgate or the gas station or passing the highway tollgate, by way of the radio transmission path 5, and enables users to use these various data in the moving object 23. In this case, a transmitting unit 8 of the transmitting system 3 and a receiving unit 9 of the receiving system have to be so arranged that no obstructions which interfere with data transmission are placed on the radio transmission path 5 between the transmitting unit 8 and the receiving unit 9. In particular, since the space required for the installation of the receiving system in the moving object 23 is limited, the receiving system has to be so arranged as to be kept out of the way of an operator, a user or the like of the moving object 23.

Next, the operation of the data transmission system in accordance with embodiment 4 of the present invention will be explained. The transmitting system 3 installed in a station platform outputs n fixed-pattern-added low-speed data outputted thereto from a fixed pattern adding unit 7 from the transmitting unit 8 to the moving object 23 when the moving objects 23, such as a train, approaches the station platform. In this case, the moving object 23 may stop at or pass the station platform. The n fixed-pattern-added low-speed data outputted from the transmitting unit 8 are received by the receiving unit 9 of the receiving system 4 disposed in the moving object 23 via the radio transmission path 5. The n fixed-pattern-added low-speed data received by the receiving unit 9 are then inputted into a data merging unit 11 via a fixed pattern removing unit 10, and original single high-speed data 12 is reproduced by the data merging unit 11. The original single high-speed data 12 reproduced by the data merging unit 11 is then sent out onto the other network 2, and is temporarily stored in the storage unit of the data control apparatus 24. The data control apparatus 24 can reproduce original image data etc. from this data temporarily stored in the storage unit thereof.

Thus, since the data transmission system in accordance with this embodiment 4 uses the data transmission method according to either of above-mentioned embodiments 1 to 3, the data transmission system can transmit high-speed data from the transmitting system 3 installed in such a construction as a station platform, to the moving object 23, such as a train which is stopping at or passing the station platform, and can carry out the division of the original high-speed data into the plurality of low-speed data and the reproduction of the original high-speed data while ensuring the wire-rate performance of the source network channel. In this embodiment 4, the data transmission system transmits data from the transmitting system 3 installed in such a construction as a station platform to the moving object 23, such as a train which approaches the station platform, as previously explained. As an alternative, when the moving object 23 stops in the vicinity of the construction such as a station platform, the data transmission system can transmit data from the transmitting system 3 to the moving object 23 which is stopping in the vicinity of the construction.

Although a train or the like in which the other network 2 is installed generally stops at or passes a station platform or the like in a very slight time, in the data transmission system to which the data transmission method according to either of above-mentioned embodiments 1 to 3, the receiving system 4 can compensate for the differences in delay time among the plurality of low-speed data transmitted from the transmitting system 3 which are equal to or less than a minimum data length or one-half of the minimum data length. In addition, since the data dividing unit 6 adds a fixed pattern to each or either of the head and end of each of the n low-speed data 16-1 to 16-$n$ into which the high-speed data is divided by using an idle interval 15, the division of the original high-speed data into the plurality of low-speed data and the reproduction of the original high-speed data can be carried out while the wire-rate performance of the source network channel is ensured. Therefore, a low-cost data transmission system which applies no load to the networks can be constructed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data transmission method of transmitting a high-speed data signal, in which two or more data are disposed and separated by no-signal intervals each having a same predetermined data length, from a transmit station connected to a network to a receive station connected to another network, said method comprising:

a dividing step of dividing each of said plurality of data into two or more low-speed data in the transmit station, so as to create two or more sequences of low-speed data which are separated by no-signal intervals each having the predetermined data length;

a fixed-pattern adding step of adding a fixed pattern for detecting a head or an end of each low-speed data included in each of said two or more sequences of low-speed data to each of said no-signal intervals included in each of said two or more sequences of low-speed data in the transmit station, so as to create two or more sequences of fixed-pattern-added low-speed data; and a transmitting step of transmitting, from the transmit station, said two or more sequences of fixed-pattern-added low-speed data to said receive station connected to said other network.

2. The data transmission method according to claim 1, wherein said fixed-pattern adding step is the step of, when control data is provided to the head or end of each low-speed data included in each of said two or more sequences of low-speed data in advance, overwriting the control data with a fixed pattern for detecting the head or end of each low-speed data, and adding a fixed pattern for detecting the end or head of each low-speed data to the end or head of each low-speed data.

3. The data transmission method according to claim 2, wherein the fixed patterns added to the head and end of each low-speed data included in each of said two or more sequences of low-speed data are of different types.

4. The data transmission method according to claim 2, wherein the fixed patterns added to the head and end of each low-speed data included in each of said two or more sequences of low-speed data are of an identical type, and said fixed-pattern adding step is the step of alternately adding two different types of fixed patterns to the head and end of each low-speed data included in each of said two or more sequences of low-speed data.

5. The data transmission method according to claim 2, wherein the fixed patterns added to the head and end of each low-speed data included in each of said two or more sequences of low-speed data are of different types, and said fixed pattern adding step is the step of alternately adding four different types of fixed patterns to each of the head and end of each low-speed data included in each of said two or more sequences of low-speed data.

6. A data transmission apparatus comprising:

a data dividing unit for receiving a high-speed data signal, in which two or more data are disposed and separated by no-signal intervals each having a same predetermined data length, and for dividing each of said plurality of data into two or more low-speed data so as to create two or more sequences of low-speed data which are separated by no-signal intervals each having the predetermined data length;

a fixed-pattern adding unit for adding a fixed pattern for detecting a head or an end of each low-speed data included in each of said two or more sequences of low-speed data to each of said no-signal intervals included in each of said two or more sequences of low-speed data so as to create two or more sequences of fixed-pattern-added low-speed data; and a transmitting unit of transmitting said two or more sequences of fixed-pattern-added low-speed data to a network on a receive side.

7. A data transmission system for transmitting a high-speed data signal, in which two or more high-speed data are disposed and separated by no-signal intervals each having a same predetermined data length, from a transmitting system connected to a network to a receiving system connected to another network, said transmitting system including a data dividing unit for dividing each of said two or more data into two or more low-speed data so as to create two or more sequences of low-speed data which are separated by no-signal intervals each having the predetermined data length, and a fixed-pattern adding unit for adding a fixed pattern for detecting a head or an end of each low-speed data included in each of said two or more sequences of low-speed data to each of said no-signal intervals included in each of said two or more sequences of low-speed data so as to create two or more sequences of fixed-pattern-added low-speed data, and said receiving system including a receiving unit for receiving said two or more sequences of fixed-pattern-added low-speed data, a fixed pattern removing means for removing the fixed patterns from each fixed-pattern-added low-speed data included in each of said two or more sequences of fixed-pattern-added low-speed data so as to extract said two or more sequences of low-speed data, and a reproducing means for reproducing said two or more high-speed data from said two or more sequences of low-speed data extracted by said fixed pattern removing means, and for sending out said two or more high-speed data onto said other network.

8. The data transmission system according to claim 7, wherein said network is disposed in a station and said other network is disposed in a train which stops at or passes the station.

9. The method of claim 1, wherein said dividing step divides each of said two or more data into n, where n is at least two, low-speed data so as to create n sequences of low-speed data which are separated by no-signal intervals each having the predetermined data length, and a bit rate of said low-speed data is 1/n of a bit rate of said high-speed data.

10. The apparatus of claim 6, wherein said data dividing unit divides each of said two or more data into n, where n is at least two, low-speed data so as to create n sequences of low-speed data which are separated by no-signal intervals each having the predetermined data length, and a bit rate of said low-speed data is 1/n of a bit rate of said high-speed data.

11. The system of claim 7, wherein said data dividing unit divides each of two or more high-speed data into n, where n is at least two, low-speed data so as to create n sequences of low-speed data which are separated by no-signal intervals each having the predetermined data length, and a bit rate of said low-speed data is 1/n of a bit rate of said high-speed data.

* * * * *